United States Patent [19]
Kolk et al.

[11] Patent Number: 5,823,126
[45] Date of Patent: Oct. 20, 1998

[54] MECHANICAL SEEDLING TRANSPLANTER

[75] Inventors: Howard Kolk; Robert Kolk; Ken Kooiker, all of Holland; Brent Dykgraaf, Zeeland, all of Mich.

[73] Assignee: Mechanical Transplanter Company, Holland, Mich.

[21] Appl. No.: 766,676

[22] Filed: Dec. 13, 1996

[51] Int. Cl.⁶ .................................................. A01C 11/00
[52] U.S. Cl. ............................ 111/109; 111/104; 111/100
[58] Field of Search .................................. 111/100, 101, 111/102, 103, 104, 105, 109; 47/1.01; 701/50

[56] References Cited

U.S. PATENT DOCUMENTS

| | | | |
|---|---|---|---|
| 4,132,337 | 1/1979 | Masuda et al. | 111/105 X |
| 4,290,373 | 9/1981 | Boots et al. | 111/105 |
| 4,660,479 | 4/1987 | Crisio, Jr. et al. | 111/105 |
| 4,788,920 | 12/1988 | Shaw | 111/105 |
| 4,886,002 | 12/1989 | Scudellaro | 111/102 |
| 5,121,701 | 6/1992 | Reed et al. | 111/105 |
| 5,159,887 | 11/1992 | Poll | 111/100 X |
| 5,415,115 | 5/1995 | Masuda et al. | 111/105 |
| 5,605,105 | 2/1997 | Clark et al. | 111/127 |

*Primary Examiner*—Terry Lee Melius
*Assistant Examiner*—Victor Batson
*Attorney, Agent, or Firm*—Baker & Daniels

[57] ABSTRACT

A mechanical transplanter device for transplanting seedlings along a path includes a frame, a furrow opening shoe mounted on the frame and engaging the ground for opening a furrow in the ground, and seedling delivery means including a reciprocating stabilizing arm mounted on the frame. The transplanter of the present invention delivers seedlings to the furrow at specific predetermined distance intervals input by the operator into the electronic control system, which utilizes a variable speed electric drive motor that isolates the speed or frequency of the transplanter from variations in ground speed or engine speed of the tractor towing the transplanter along the ground. The control system includes a sensing wheel for generating a distance signal as a function of the distance travelled by the transplanter along the path, and the control unit automatically adjusts the speed of the drive motor as a function of that distance, so that the seedlings are always planted at the desired distance interval regardless of the speed of the tractor.

21 Claims, 6 Drawing Sheets

MECHANICAL SEEDLING TRANSPLANTER

The present invention relates generally to mechanical seedling transplanters. More specifically, the present invention relates to a computer controlled timing mechanism that times the delivery of the seedling to correspond to the action of the stabilizing kicker, thus eliminating timing and spacing problems, and which timing mechanism operates independently of the speed of the tractor used to tow the transplanter through a field.

BACKGROUND OF THE INVENTION

Mechanical transplanter devices are generally well known in the art. Typically, mechanical seedling transplanters include a furrow opener device that opens a furrow in the ground as the transplanter moves through a field. The transplanter continuously drops seedlings into the open furrow, and then closes the furrow and compacts the soil around the seedling after the seedling has been deposited in the ground. Also, because seedling transplanters must be able to accommodate a variety of plant types, each of which may require different spacing between the seedlings, the transplanter must be adjustable so that the seedlings will be spaced apart at specific predetermined intervals along the path of the transplanter.

One problem with prior art mechanical transplanters is that adjusting the spacing between the seedlings is very difficult. Most prior art transplanters utilize a rotating tray having a series of hinged funnels or cups that open and drop the seedlings into a delivery chute that leads to the furrow opened by a plow or shoe carried by the transplanter. When the seedling enters the furrow, a reciprocating stabilizing member or "kicker" swings into place and momentarily supports the seedling while the soil is compacted around it. The kicker then swings out of the way so that the next seedling can enter the furrow. The action of the kicker and the opening of the hinged cup typically are synchronized by a system of gears or chains, all of which is normally driven by a Power Take Off Unit (PTO) connected to the tow tractor that pulls the transplanter through the field. Unfortunately, unless the transplanter is operated on perfectly flat terrain and at a uniform speed, it is extremely difficult to achieve uniform spacing between the transplanted seedlings. The frequency of the transplanter, (i.e. the number of planting cycles per minute), is responsive to the engine speed of the tractor by virtue of the PTO unit. Therefore, each time the tractor engine speeds up or slows down, such as when the operator of the tractor shifts gears, there is a corresponding change in the speed of the PTO, which directly affects the frequency of the transplanter. An increase or a decrease in the frequency greatly alters the distance between the transplanted seedlings. The wrong spacing between seedlings seriously undermines the cost effectiveness of the transplanter, because seedlings planted too close together will not thrive, while seedlings planted too far apart waste valuable farmland.

Another problem with prior art transplanters is that the delivery of the seedling into the open furrow must be precisely timed so that it coincides with the action of the stabilizing kicker. For example, the hinged cup on the rotating tray referred to above drops the seedling through the chute and into the ground immediately before the kicker swings into position to support the seedling. Again, the cup must open and drop the seedling at the proper moment so that when the seedling reaches the furrow the kicker immediately swings into place to stabilize the plant. If the plant is dropped too soon, the plant will fall over and be crushed by the kicker. On the other hand, if the plant is dropped too late the seedling will fall onto the top of the kicker and never reach the furrow at all. In order to prevent this problem, each time the desired spacing between plants or the frequency of the transplanter is changed, the operator must advance or retard the action of the rotating tray relative to the action of the kicker by rotating the tray on its shaft. Unfortunately, this method is very imprecise and does nothing to remedy the other problems referred to above.

Accordingly, there exists a need for an improved mechanical transplanter that controls the spacing between the transplanted seedlings. There also exists a need for an improved mechanical transplanter that plants seedlings at a desired interval regardless of the speed of the tractor or the topography of the field.

SUMMARY OF THE INVENTION

The improved mechanical transplanter of the present invention solves the problems referred to above. The present invention utilizes an electronic control system that allows the operator to program the desired distance between seedlings into a keypad, and then the control system automatically controls the distance between the transplanted seedlings regardless of the speed of the transplanter relative to the ground and regardless of the engine speed of the tractor used to pull the transplanter. The present transplanter utilizes a variable speed electric motor to drive the seedling delivery mechanism, which isolates the speed of the delivery system from the engine speed of the tractor and eliminates the problems caused by the more conventional PTO driven transplanters.

The control system of the present invention includes a keypad that allows the operator to punch in the desired distance or interval between the transplanted seedlings, and this desired distance or interval is converted to a signal. The control system also includes a sensing wheel that runs along the ground and measures the distance the transplanter has travelled since the last seedling was deposited in the ground, and this distance is likewise converted to a discrete signal. The control system monitors the these signals and adjusts the speed of the variable speed motor, and hence the frequency of the delivery mechanism, in order to plant the seedlings at the desired interval. In other words, the control system monitors the operation of the delivery system as a function of the desired spacing or interval between seedlings and the distance travelled by the transplanter since the last seedling was planted. As such, the transplanter of the present invention will always plant the seedlings at the desired spacing regardless of the engine speed of the tractor, the speed of the tractor relative to the ground, or other variables.

The improved transplanter also incorporates an improved stabilizing kicker that allows the transplanter to operate in a wider frequency range. On traditional transplanters, the kicker is connected to the rotating plant tray. Because the plant tray is constantly rotating, the kicker is constantly swinging back and forth. At certain speeds the seedling may drop onto the kicker rather than into the furrow, which usually destroys the seedling. By comparison, the present kicker is driven by a cam, and accordingly the kicker remains in a retracted position until the seedling is dropped. This delay feature makes it much less likely that the kicker will obstruct the normal path of the seedling, which completely eliminates the need to advance or retard the timing of the kicker, which in turn makes possible to plant many more seedlings per minute than is possible with prior art transplanters. The kicker of the present invention also utilizes a novel self-cleaning feature that prevents the build-up of dirt and other debris inside the furrow opening shoe by continuously cleaning the shoe with each cycle of the kicker.

Accordingly, it is an object of this invention to provide an improved mechanical transplanter that isolates the seedling delivery mechanism from the engine speed of the tractor.

It is another object of this invention to provide an improved mechanical transplanter that allows the operator to input the desired distance between seedlings using a keypad.

Another object of this invention is to provide an improved mechanical transplanter that can plant seedlings at a wide variety of distances and that can operate at a wide range of speeds.

A still further object of this invention is to provide a mechanical transplanter with an improved seedling delivery tube that delivers the seedling more quickly and more reliably than the prior art hinged cup design.

Another object of this invention is to provide a mechanical transplanter with an improved cam driven kicker design that incorporates a delay feature, and that continuously cleans dirt and debris from the furrow opening shoe.

These and other objects of the invention will become readily apparent to those skilled in the art upon a reading of the following description.

BRIEF DESCRIPTION OF THE DRAWINGS

FIG. 1A is an enlarged fragmentary view in perspective taken at 1A of FIG. 1 and illustrating a portion of the drive system that connects the drive chain to the drive sprocket of the seedling delivery mechanism;

DETAILED DESCRIPTION OF THE INVENTION

The embodiment herein described is not intended to be exhaustive or to limit the invention to the precise form disclosed. It is chosen and described to explain the principles of the invention and its application and practical use to best enable others skilled in the art to follow its teachings.

Figure 1:
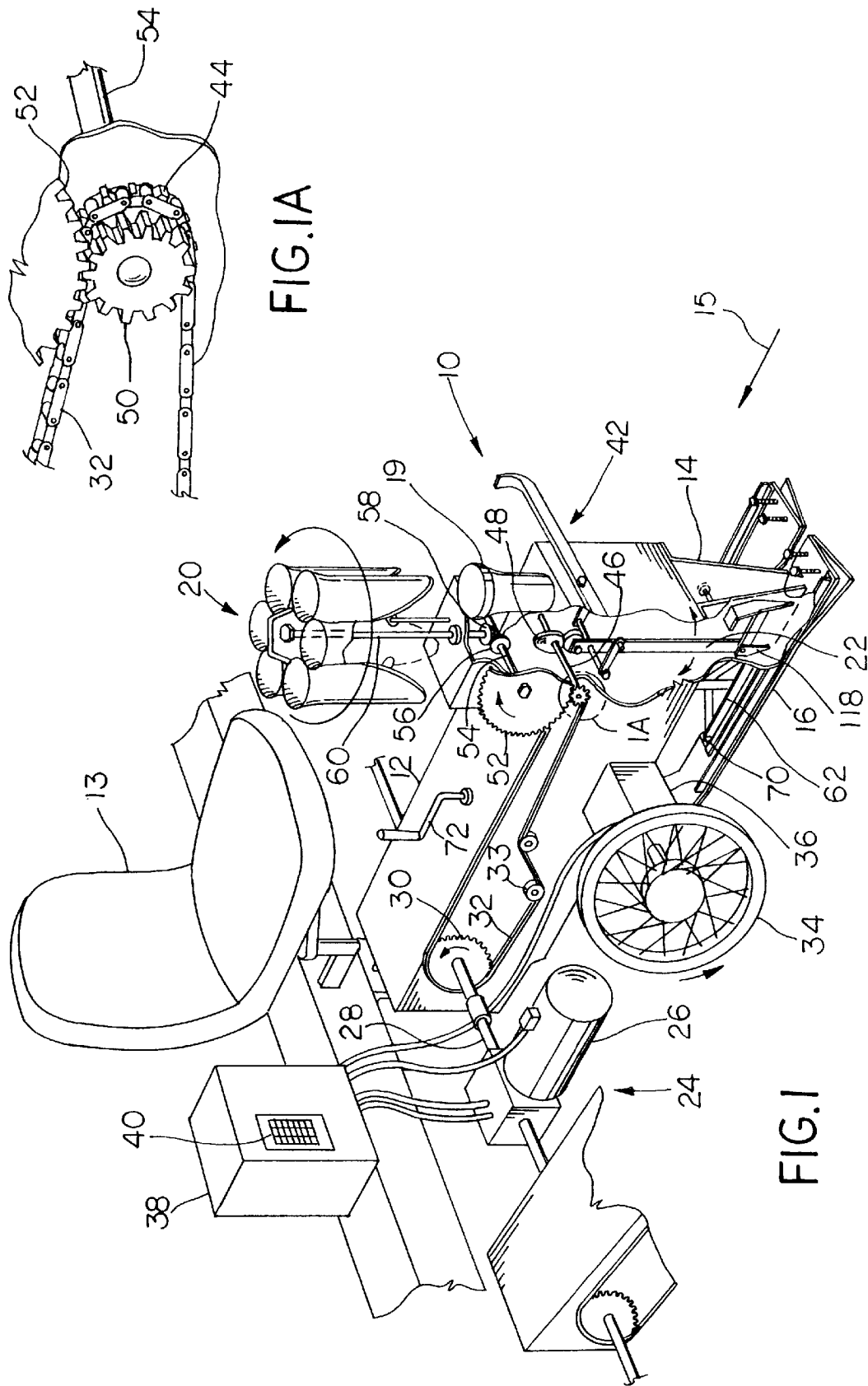
FIG. 1 is a fragmentary perspective view of the mechanical transplanter according to the present invention, shown with portions of the transplanter cut away to reveal the cam driven kicker and the self-cleaning member attached to the kicker.

Referring now to the drawings, a single row mechanical transplanter generally indicated by the reference numeral 10 is towed by a tractor or similar means (not shown). The single row transplanter 10 can be used in combination with similar units, such as in sets of four, six, or eight towed side by side. For applications requiring very close spacing between rows, the adjacent transplanters can be offset from each other. As shown in FIG. 1, the transplanter 10 includes a frame 12 that is typically connected to the draw bar of the pulling tractor (not shown). An operator (not shown) sits in seat 13 as the transplanter 10 is towed along a path in a forward direction 15. A furrow opening plow or shoe 14 is attached to frame 12, and extends into the ground for opening a furrow as the transplanter is pulled along a path as is discussed in greater detail below. A compacting skid 16 is attached to frame 12, and includes a central slot for accommodating furrow opening shoe 14. Transplanter 10 also includes a seedling delivery chute 19 positioned over the rearward portion of opening shoe 14, and further includes a rotating seedling tray 20 positioned above seedling delivery chute 19, so that a seedling dropped from the rotating tray 20 falls through delivery chute 19 and into the open furrow in the ground. A reciprocating stabilizing member or kicker 22 is pivotally mounted to frame 12 inside of opening shoe 14, and reciprocates back and forth within opening shoe 14 so that kicker 22 stabilizes the seedling that has been dropped into the furrow as the furrow is closed and the soil compacted around the seedling by compacting skid 16.

Drive assembly 24 is mounted to frame 12 and includes variable speed electric motor 26 which includes output shaft 28. As shown in FIG. 1, a single control unit 38 and drive motor 26 may be used to operate a number of additional transplanters mounted adjacent to transplanter 10. Output shaft 28 includes drive sprocket 30, which is drivingly connected to seedling delivery system 42 by drive chain 32, thus communicating driving power to seedling delivery system 42 for driving rotating tray 20 and kicker 22 as is discussed in greater detail below. A spring loaded tensioner 33 maintains the proper tension on drive chain 32. Distance sensing wheel 34 is mounted to frame 12 in a position so that sensing wheel 34 rolls along the ground. Sensing wheel 34 is connected to converter unit 36 which generates an electronic distance signal as transplanter 10 is pulled along a path. Converter unit is electrically connected to control unit 38, and control unit 38 includes input keypad 40, which allows the operator to punch in the desired spacing between the transplanted seedlings. Control unit 38 converts the desired spacing input on keypad 40 by the operator into an interval signal. Control unit 38 is also electrically connected to variable speed drive motor 26. Control unit 38 controls the speed of the motor 26, taking into account the distance travelled by the transplanter 10 and the desired interval input through keypad 40 by the operator.

Figure 2:
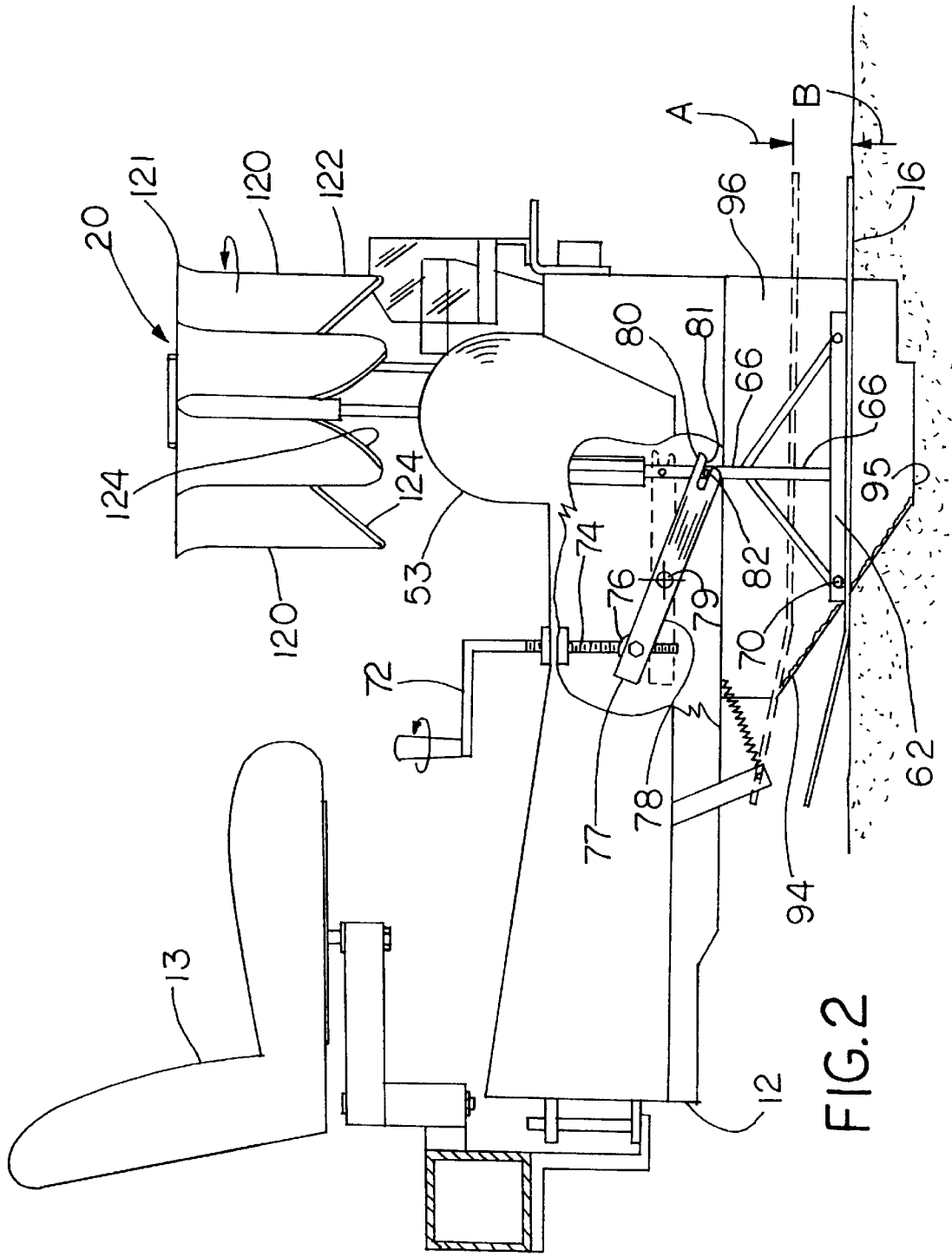
FIG. 2 is a side elevational view, partly in section, of the mechanical transplanter shown in FIG. 1.

Seedling delivery mechanism 42 is drivingly connected to drive sprocket 30 of variable speed motor 26 by drive chain 32. Delivery mechanism 42 includes sprocket 44 which is connected to drive chain 32. Drive sprocket 44 and transition gear 50 are connected to rotating camshaft 46 having rotating cam 48. The rotation of cam 48 operates kicker 22 as is discussed in greater detail below. Transition gear 50 intermeshes with drive gear 52 which in turn rotates drive shaft 54. Drive shaft 54 includes drive gear 56, which intermeshes with driven gear 58 on vertical shaft 60 in order to rotate tray 20. Gear 52 may include an optional protective shroud 53 as shown in FIG. 2. The drive sprocket 44, gears 50 and 52, shaft 54, gears 56 and 58, shaft 46 and cam 48 constitute a synchronizing drive for driving both the seedling tray 20 and the kicker 22 sequentially to permit the kicker 22 to stabilize the seedling after the seedling has been deposited in the furrow.

Figure 3:
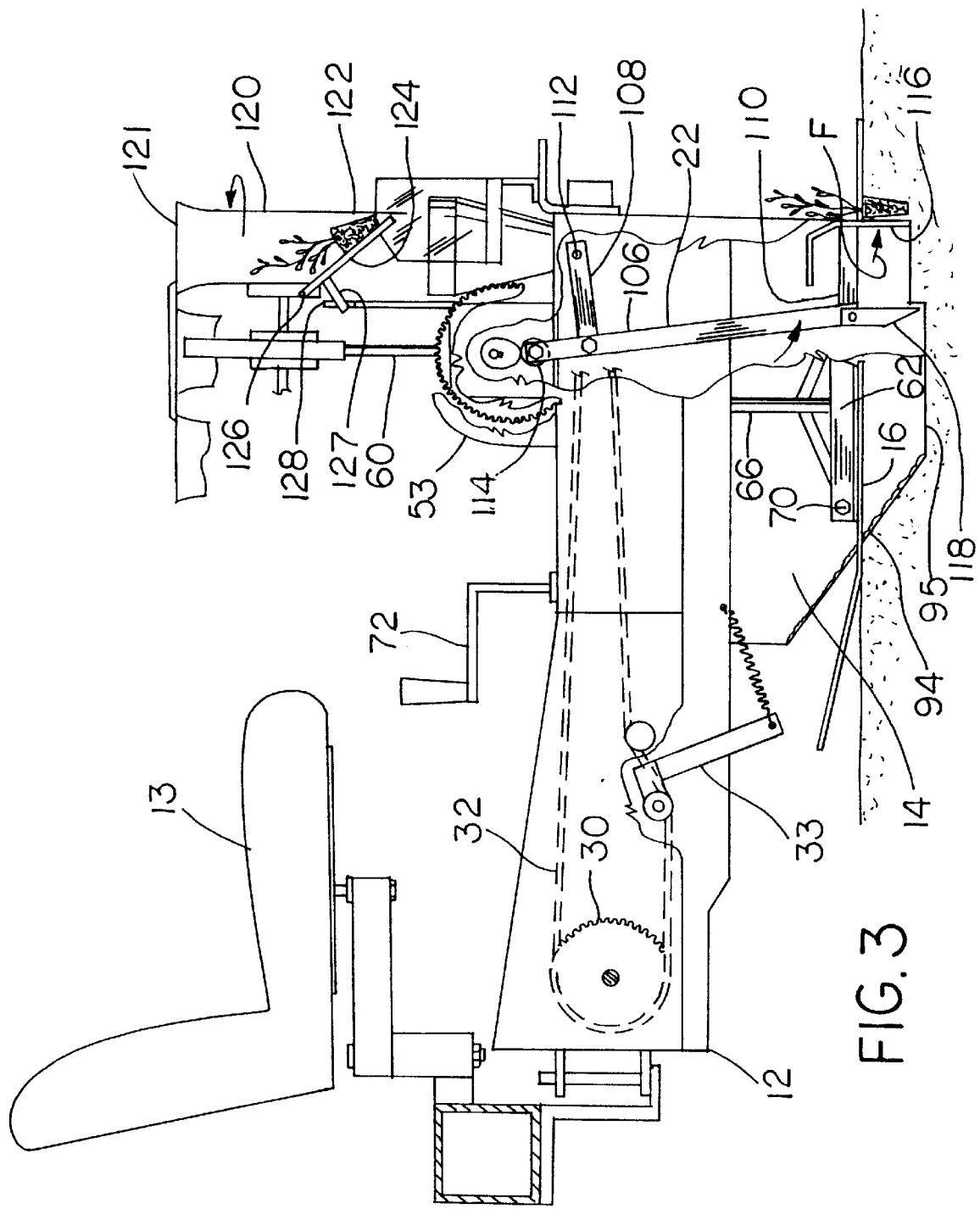
FIG. 3 is a side elevational view similar to that shown in FIG. 2, in which the cam driven kicker is fully extended and pushing a seedling out of the back of the transplanter, and showing the next seedling in the cylindrical cup assembly.
Figure 4:
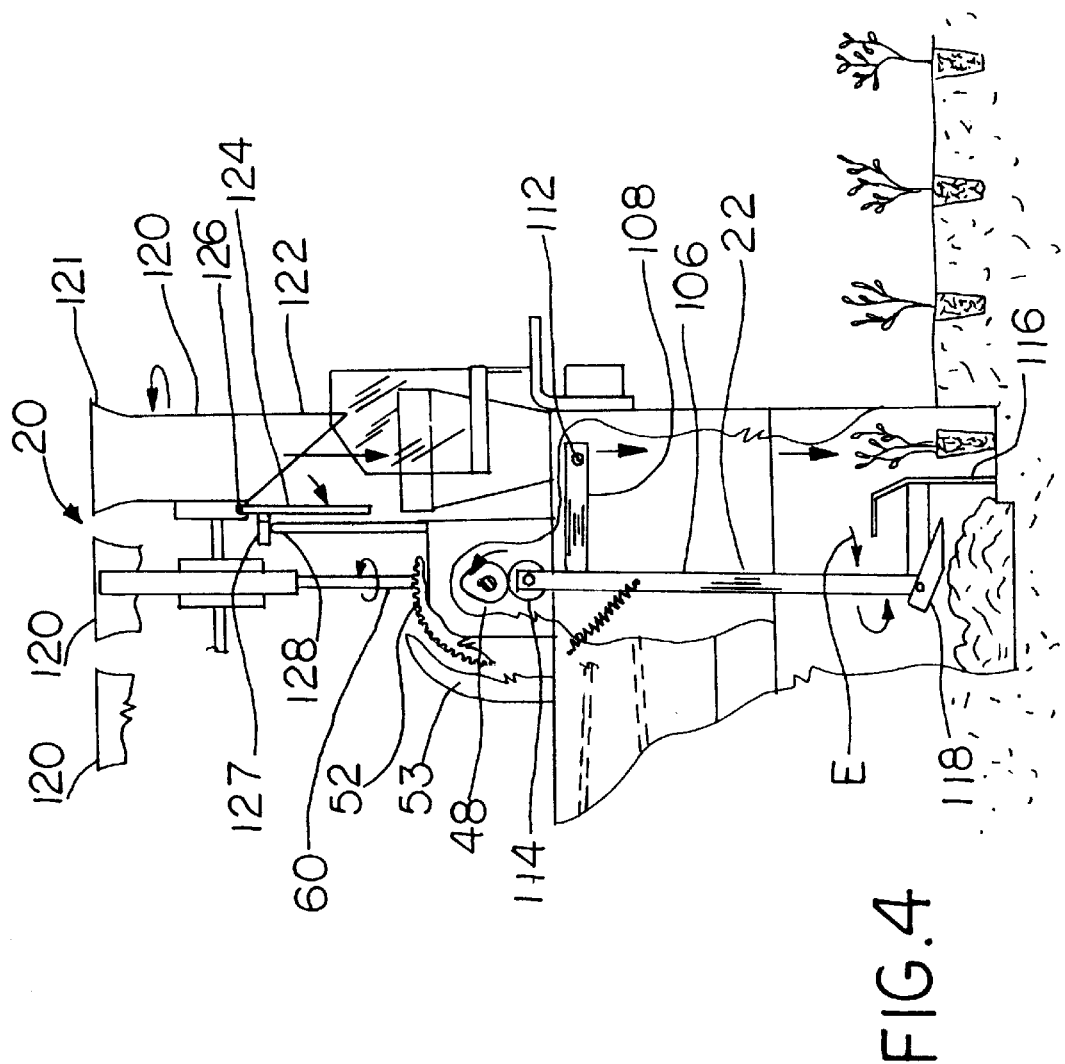
FIG. 4 is a fragmentary side elevational view, partly in section, similar to FIGS. 2 and 3, in which the kicker is retracted and the seedling has just dropped into the furrow.

As shown to advantage on FIGS. 3 and 4, rotating tray 20 includes a plurality of cylindrical delivery cylinders 120, with six being shown in the present embodiment. Each cylinder 120 includes infeed end 121 and discharge end 122. Discharge end 122 is truncated or slanted, and an oval shaped flap or gate 124 is attached to end 122 by hinge or pivot pin 126. Each gate 124 includes lever or lifter arm 127. As rotating tray 20 rotates, each cylinder 120 is in turn positioned over delivery chute 19, and lifter arm 127 on each gate 124 contacts stationary cam or member 128 as each cylinder approaches the position over chute 19. The rotation of tray 20 forces lifter arm 127 into contact with member 128, which forces gate 124 open, thus enabling a seedling to drop from cylinder 120, through delivery chute 19, and into the open furrow. In the embodiment shown in which tray 20 includes six cylinders 120, gear 50 turns six revolutions for every revolution of gear 52, so that camshaft 46 will rotate six times for every revolution of tray 20. For embodiments containing a different number of cylinders, the drive ratio would be adjusted accordingly. For example, a 4:1 ratio would be used on a four cylinder embodiment.

Figure 5:
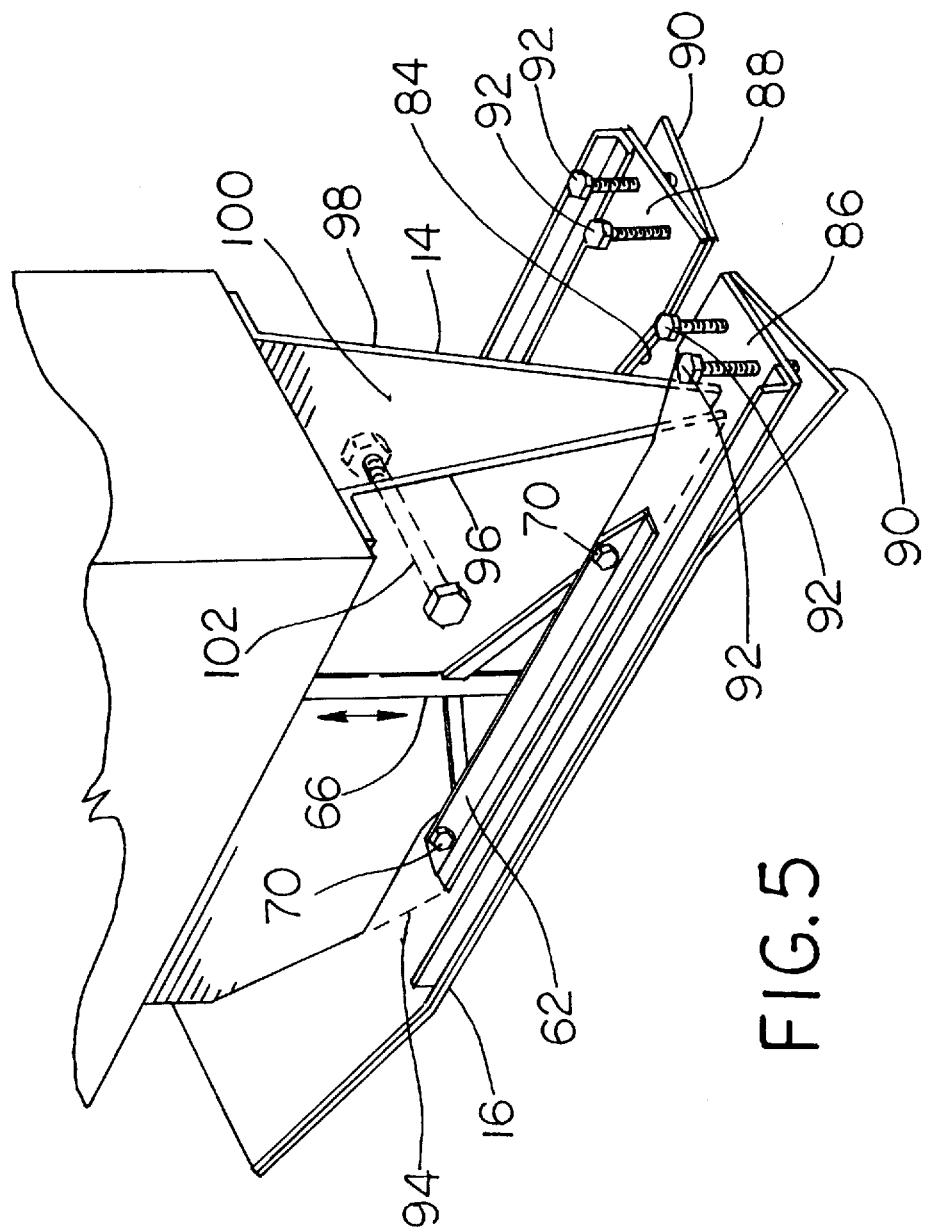
FIG. 5 is a fragmentary view in perspective of the mechanical transplanter showing the adjustable opener and the adjustable height adjustable compacting skid.
Figure 6:
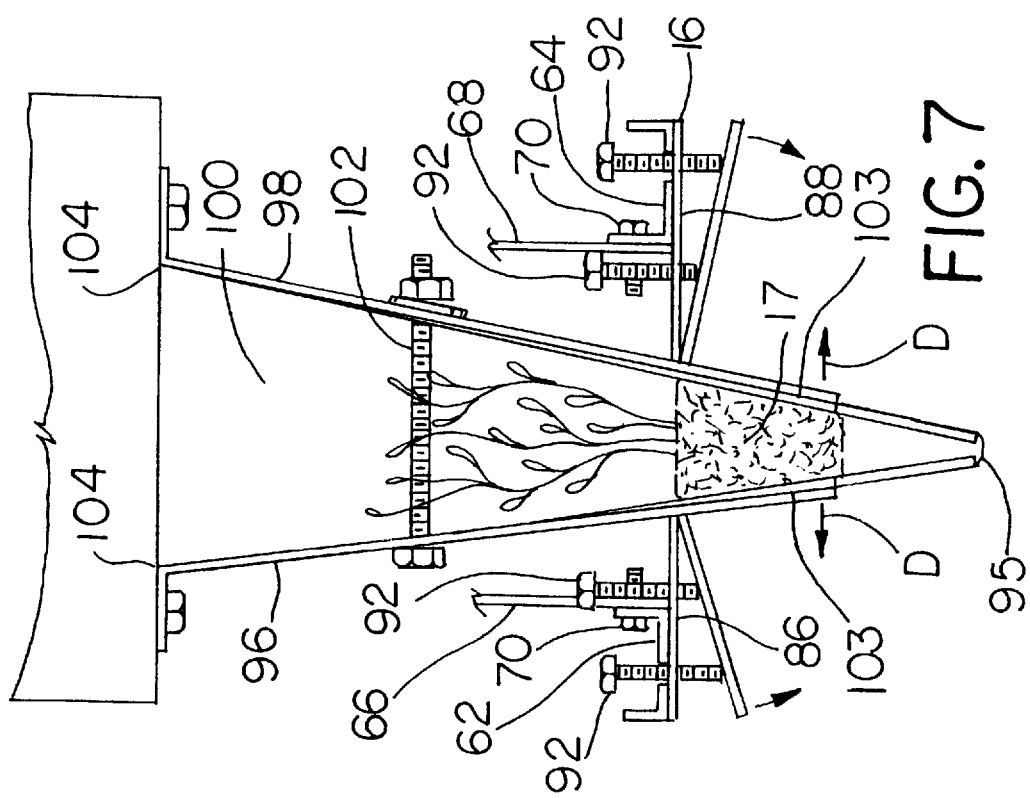
FIG. 6 is a fragmentary rear elevational view of the adjustable opener shown adjusted for planting a small seedling.
Figure 7:
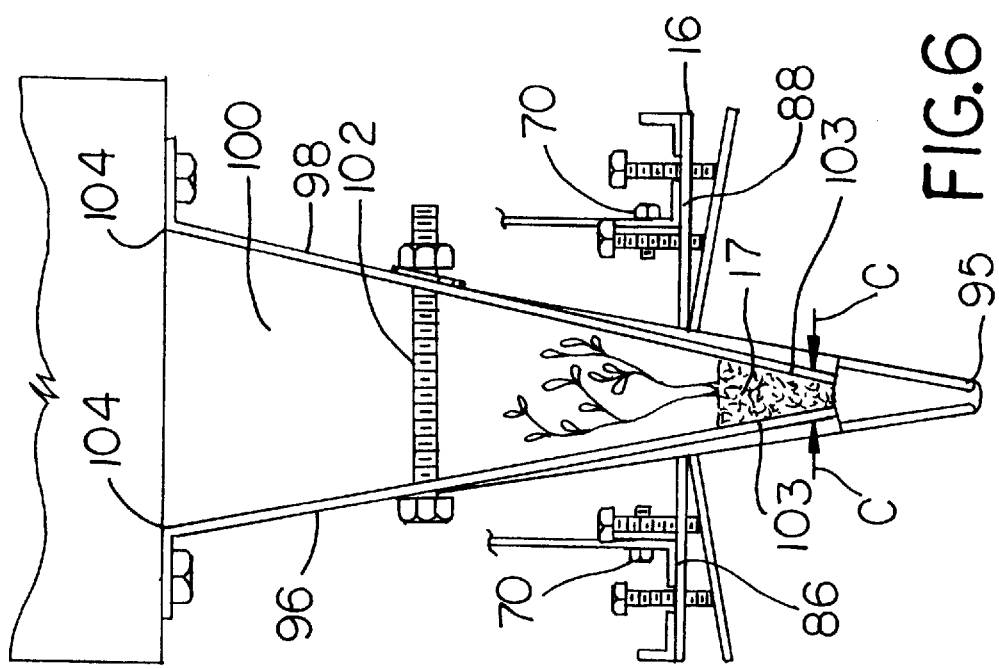
FIG. 7 is a fragmentary rear elevational view similar to that shown in FIG. 6, but with the adjustable opener shown adjusted for planting a large seedling.

Referring now to FIGS. 2, 5, 6 and 7, adjustable compacting skid 16 includes a pair of angled mounting brackets 62, 64. Brackets 62, 64 are connected to a pair of supports 66, 68 by a plurality of bolts 70 so that skid 16 can be removed from transplanter 10 for maintenance or repair by removing bolts 70. The elevation of skid 16 can be changed by adjusting rotatable crank 72 mounted to frame 12. A shown in FIG. 2, Crank 72 includes threads 74, which are engaged by follower 76 on end 77 pivoting rocker arm 78. Rocker arm 78 is mounted to frame 12 by pivot pin 79, and end 80 of rocker arm 78 defines a slotted aperture 81 which engages pin 82 on each of supports 66, 68. By virtue of follower 76, rotation of crank 72 causes rocker arm 78 to pivot about pin 79, raising or lowering end 77, which in turn lowers or raises end 80, thus lowering or raising skid 16. Thus, the elevation of skid 16 can be adjusted between the raised position indicated by reference arrow A, shown in dotted lines in FIG. 2, and the lowered position indicated by reference arrow B. As shown in FIG. 5, skid 16 also includes a central slot 84 for accommodating shoe 14, and a pair of trailing arms 86, 88 having adjustable closing tabs 90 which close the open furrow after a seedling has been deposited therein. The position of closing tabs 90 can be adjusted by turning the adjusting bolts 92.

Shoe 14 includes a leading edge 94, a lower edge 95, and a pair of side plates 96, 98 defining a space 100 therebetween. Reciprocating kicker 22 is disposed in space 100 as is discussed in greater detail below. Side plates 96, 98 are welded, bolted, or otherwise secured to frame 12. Threaded adjusting bolt 102 extends between side plates 96, 98, so that side plates 96, 98 can be adjusted towards an inward direction shown by reference arrow C and an outward direction shown by reference arrow D by turning adjusting bolt 102. Lower edges 103 of side plates 96, 98 are naturally biased in the outward direction D by virtue of the rigid moment resisting corners 104. Alternatively, a spring or similar device (not shown) may be used to bias side plates 96, 98 outwardly.

Referring now to FIGS. 1, 3 and 4, kicker 22 includes post 106, pivot arm 108 and lower member or arm 110. Kicker 22 is pivotally attached to frame 12 by pivot pin 112 on pivot arm 108, so that kicker 22 is disposed within space 100 between side plates 96, 98. The upper portion of post 106 includes cam follower 114, so that as cam 48 rotates, the cam follower causes kicker 22 to pivot between a forward or retracted position indicated by the reference arrow E in FIG. 4, and the rearward or extended position indicated by the reference arrow F in FIG. 3. Stabilizing plate 116 is attached to the end of arm 110, such that stabilizing plate 116 abuts and stabilizes a seedling that has been dropped into the furrow, and pushes the seedling out of the space 100 between plates 96, 98 as the transplanter 10 moves forward. Cleaning arm 118 is attached to the lower portion of post 106 by a pivot pin. Arm 118 pivots to the folded position shown in FIG. 4 as kicker 22 moves in the forward direction, and pivots to the unfolded cleaning position shown in FIG. 3 as kicker 22 moves in the rearward direction. Arm 118 thus removes dirt and other debris from space 100 between plates 96, 98 as kicker 22 reciprocates back and forth.

In operation, an operator (not shown) sits on seat 13 and places seedlings 17 from a stationary loading tray (not shown) into cylinders 120 of rotating tray 20 as transplanter 10 is pulled along a path in direction 15. Shoe 14 opens a furrow in the ground so that seedlings 17 can be planted in the ground at the desired distance interval. After a seedling 17 has been deposited into the furrow, adjustable closing tabs 90 on compacting skid 16 close the furrow and compact the soil around the seedling.

The operator (not shown) inputs the desired spacing or interval between plants into the keypad 40 of control unit 38. Sensing wheel 34 rolls along the ground as transplanter 10 moves along the path, and measures the distance travelled by transplanter 10 since the last seedling was planted. Converter 36 converts the measured distance to a discrete signal and communicates the signal to control unit 38. Control unit 38 controls the speed of drive motor 26 as a function of the desired distance interval input by the operator and the actual distance travelled by the transplanter 10. Thus, the speed or frequency of seedling delivery mechanism 42 is controlled by unit 38 as a function of the desired distance between seedlings and the actual distance travelled by the transplanter 10, so that the seedlings 17 are planted at the desired distance interval. The speed of motor 26 is communicated to delivery mechanism 42 by output shaft 28 which turns sprocket 30 and drives chain 32. Chain 32 drives sprocket 44 on camshaft 46, which also turns gear 50. Gear 50 turns gear 52 in the ratio described above, which in turn rotates tray 20 via shaft 54, gears 56 and 58, and shaft 60. Rotation of tray 20 causes pivot arm 127 to contact stationary member 128, which opens gate 124 when cylinder 120 is over delivery chute 19. The seedling 17 in cylinder 120 thus drops through space 100 between plates 96, 98 and into the open furrow. At or about the same time, the rotation of camshaft 46 forces cam 48 against follower 114, which pivots kicker 22 about pivot pin 112 and brings stabilizing plate 116 into contact with seedling 17, which has now reached the open furrow, and holds seedling 17 in place as tabs 90 close the furrow around the transplanted plant.

It is understood that the above description does not limit the invention to the above-given details, but may be modified within the scope of the following claims.

What is claimed:

1. A transplanter for transplanting seedlings comprising a frame, means for supporting said frame for movement relative to ground, furrow opening means mounted on said frame for opening a furrow in the ground, seedling delivery means for depositing seedlings in the furrow, a stabilizer member movable between a retracted position and a stabilizing position for stabilizing the seedling in the furrow until the soil is compacted around the seedling and a synchronizing drive for driving both the stabilizer member and said seedling delivery means, a variable speed drive for driving said synchronizing drive, the speed of said drive being responsive to a control signal varying as a function of a speed signal which varies with the speed of the transplanter along the ground and a preset interval signal representing the desired distance between seedlings.

2. The device of claim 1, wherein said seedling delivery means includes a rotating feeder tray overlying a delivery chute, said chute for delivering a seedling to the furrow, said tray including a plurality of cylindrical cups, each of said cups for holding a seedling to be transplanted, each of said cups having a slanted bottom portion and a hinged gate attached to said bottom portion, and release means for opening said hinged gate when each of said cups is over said delivery chute, thereby dropping the seedling from each of said cups into said chute and into the furrow.

3. The device of claim 2, wherein said release means includes a stationary member attached to said frame adjacent said delivery chute and said hinged gate includes a pivot arm, whereby said pivot arm contacts said stationary member as said rotating tray positions each of said cylindrical cups rotates over said delivery chute, thereby opening said gate and dropping the seedling into said delivery chute.

4. The device of claim 1, wherein said seedling delivery means includes a rotating shaft drivingly connected to said rotating tray, said synchronizing drive including a cam, and wherein said stabilizing members includes a reciprocating kicker, said kicker including a cam follower responsive to said cam for moving said kicker between the retracted position and the stabilizing position, so that said cam moves said kicker into said stabilizing position each time a seedling is dropped from said cups, through said chute, and into the furrow.

5. The device of claim 1, wherein closing means is mounted on said frame for closing said furrow, said closing means including depth control means for controlling the degree of soil compaction around the transplanted seedling.

6. The device of claim 5, wherein said depth control means a rotatable handle and a rocker arm, the central portion of said rocker arm being pivotally mounted to said frame, wherein one end of said rocker arm is pivotally connected to said closing means and the other end of said rocker arm is in threaded engagement with said rotatable handle, so that upon rotation of said handle said rocker arm pivots about said central portion thereby raising or lowering said closing means relative to the ground.

7. The device of claim 6, wherein said connection between said one end of said rocker arm and said closing means is a pin in slot connection.

8. A transplanter for transplanting seedlings comprising a frame, means for supporting said frame for movement relative to ground, furrow opening means mounted on said frame for opening a furrow in the ground, seedling delivery means for depositing seedlings in the furrow at a rate which varies in accordance with a control signal controlling the seedling delivery means, and a controller for generating said control signal as a function of a speed signal which varies with the speed of the transplanter along the ground and a preset interval signal representing the desired distance between seedlings, said furrow opening means including a pair of side plates defining a space therebetween, each of said side plates including a lower portion extending into the ground, and adjustment means connecting said side plates for adjusting the width of said space between said side plates thereby adjusting the width of the furrow.

9. The device of claim 8, wherein said adjustment means includes a threaded bolt extending between said side plates.

10. The device of claim 8, wherein stabilizing means includes a reciprocating kicker disposed between said side plates, said kicker being moveable between a retracted position and a stabilizing position, and cleaning means pivotally attached to said kicker for removing dirt and debris from the space between said side plates.

11. The device of claim 10, wherein said cleaning means includes a cleaning member pivotally attached to said kicker, said member being disposed in a folded position when said kicker is moving towards said retracted position, said member further being disposed in an unfolded position when said kicker is moving towards said stabilizing position, whereby said member scrapes dirt and other debris from said space between said side plates when said kicker is moving towards said stabilizing position.

12. A mechanical transplanter device for transplanting seedlings along a path, comprising:
    a frame mounted for movement along the path;
    a furrow opening shoe carried by said frame and engaging the ground for opening a furrow in the ground along the path;
    a seedling delivery mechanism mounted on said frame for delivering a seedling to the furrow, said seedling delivery mechanism including a delivery chute for directing the seedling to the open furrow a rotating feeder tray for delivering seedings to the chute, a stabilizing member for stabilizing the seedling in the furrow until the soil is compacted around it and a synchronizing drive for driving both said rotating feeder tray and said stabilizing member to actuate said stabilizing member sequentially after said seedling is delivered to the chute;
    a variable speed drive motor for driving said synchronizing drive;
    a pair of closing members carried by said frame for closing the furrow after a seedling has been deposited therein and for compacting soil around the transplanted seedling;
    control means connected to said drive motor for controlling said drive motor, said control means including a sensing wheel having means for generating a distance signal as a function of the distance travelled by said transplanter along the path;
    an input keypad connected to said control means for allowing an operator to input the selected distance between the seedlings to be transplanted and further for generating an interval signal as a function of the selected distance;
    means for generating a control signal for varying the speed of said drive motor as a function of the distance signal and the interval signal;
    whereby the distance between the transplanted seedlings conforms to the selected distance regardless of the speed of the transplanter relative to the path.

13. The device of claim 12, wherein said furrow opening shoe includes a pair of side plates defining a space therebetween, each of said side plates including a lower portion extending into the ground, and an adjustment bolt extending between and adjustably connecting said side plates for adjusting the width of said space between said side plates thereby adjusting the width of the furrow.

14. The device of claim 13, wherein said stabilizing member includes a reciprocating kicker pivotally mounted to said frame and disposed between said side plates, said kicker being moveable between a retracted position and a stabilizing position, and a cleaning arm pivotally attached to said kicker for removing dirt and debris from the space between said side plates.

15. The device of claim 14, wherein said cleaning arm is disposed in a folded position when said kicker is moving towards said retracted position, and wherein said cleaning arm is disposed in an unfolded position when said kicker is moving towards said stabilizing position, thereby permitting said member to scrape dirt and other debris from said space between said side plates when said kicker is moving towards said stabilizing position.

16. The device of claim 12, wherein said rotating feeder tray includes a plurality of cylindrical cups, each of said cups for holding a seedling to be transplanted, each of said cups having a slanted bottom portion and a hinged gate when each of said cups is over said delivery chute, thereby dropping the seedling from each of said cups into said chute and into the furrow.

17. The device of claim 12, wherein said synchronizing drive includes a rotating shaft drivingly connected to said rotating tray, said rotating shaft including a cam, and wherein said stabilizing member includes a reciprocating kicker, said kicker including a cam follower responsive to said cam for moving said kicker between a retracted position and a stabilizing position, so that said cam moves said kicker into said stabilizing position each time a seedling is dropped from said cups, through said chute, and into the furrow.

18. The device of claim 17, wherein said release means includes a stationary member attached to said frame adjacent said delivery chute and said hinged gate includes a pivot arm, whereby said pivot arm contacts said stationary member as said rotating tray positions each of said cylindrical cups over said delivery chute, thereby opening said gate and dropping the seedling into said delivery chute.

19. The device of claim 12, wherein said closing members includes depth control means for controlling the degree of soil compaction around the transplanted seedling.

20. The device of claim 19, wherein said depth control means includes a rotatable handle and a rocker arm, the central portion of said rocker arm being pivotally mounted to said frame, wherein one end of said rocker arm is pivotally connected to said closing members and the other end of said rocker arm is in threaded engagement with said rotatable handle, so that upon rotation of said handle said rocker arm pivots about said central portion thereby raising or lowering said closing members relative to the ground.

21. The device of claim 20, wherein said connection between said one end of said rocker arm and said closing members is a pin in slot connection.

* * * * *